(12) United States Patent
Kraft

(10) Patent No.: US 9,706,898 B1
(45) Date of Patent: Jul. 18, 2017

(54) DISH TOWEL WITH SEPARABLE MATING ELEMENTS

(71) Applicant: Claire Kraft, Raleigh, NC (US)

(72) Inventor: Claire Kraft, Raleigh, NC (US)

( * ) Notice: Subject to any disclaimer, the term of this patent is extended or adjusted under 35 U.S.C. 154(b) by 71 days.

(21) Appl. No.: 14/962,151

(22) Filed: Dec. 8, 2015

(51) Int. Cl.
*A47K 10/02* (2006.01)
*A47L 19/00* (2006.01)
*F16M 13/02* (2006.01)

(52) U.S. Cl.
CPC .............. *A47L 19/00* (2013.01); *F16M 13/02* (2013.01)

(58) Field of Classification Search
CPC ............ Y10T 428/24008; A47K 10/02; A47K 10/025
See application file for complete search history.

(56) References Cited

U.S. PATENT DOCUMENTS

| 4,625,862 A | * | 12/1986 | Clayton ................. A63B 60/62 206/315.3 |
| 7,788,733 B1 | | 9/2010 | Zahner |
| D678,704 S | | 3/2013 | Jones |
| 8,916,251 B2 | | 12/2014 | Tvelil |
| 2009/0236299 A1 | | 9/2009 | Hall |
| 2012/0003419 A1 | | 1/2012 | Xue |
| 2012/0298824 A1 | | 11/2012 | West |

FOREIGN PATENT DOCUMENTS

WO  WO9738847 A1  10/1997

* cited by examiner

*Primary Examiner* — Alexander Thomas

(57) ABSTRACT

The dish towel with separable mating elements is an attachment device that is adapted to work with a dish towel. The attachment device comprises a first element and a second element. The second element is attached to the dish towel. The first element is attached to a stationary object such as the door handle of a refrigerator or an oven. The attachment device holds the dish towel in a storage position until first element is separated from the second element which allows the dish towel to be used. The dish towel with separable mating elements comprises a dish towel and an attachment device.

16 Claims, 3 Drawing Sheets

DISH TOWEL WITH SEPARABLE MATING ELEMENTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of clips and hooks, more specifically, a clip and hook adapted for use in storing a towel

SUMMARY OF INVENTION

The dish towel with separable mating elements is an attachment device that is adapted to work with a dish towel. The attachment device comprises a first element and a second element. The second element is attached to the dish towel. The first element is attached to a stationary object such as the door handle of a refrigerator or an oven. The attachment device holds the dish towel in a storage position until first element is separated from the second element which allows the dish towel to be used.

These together with additional objects, features and advantages of the dish towel with separable mating elements will be readily apparent to those of ordinary skill in the art upon reading the following detailed description of the presently preferred, but nonetheless illustrative, embodiments when taken in conjunction with the accompanying drawings.

In this respect, before explaining the current embodiments of the dish towel with separable mating elements in detail, it is to be understood that the dish towel with separable mating elements is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dish towel with separable mating elements.

It is therefore important that the claims be regarded as including such equivalent construction insofar as they do not depart from the spirit and scope of the dish towel with separable mating elements. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
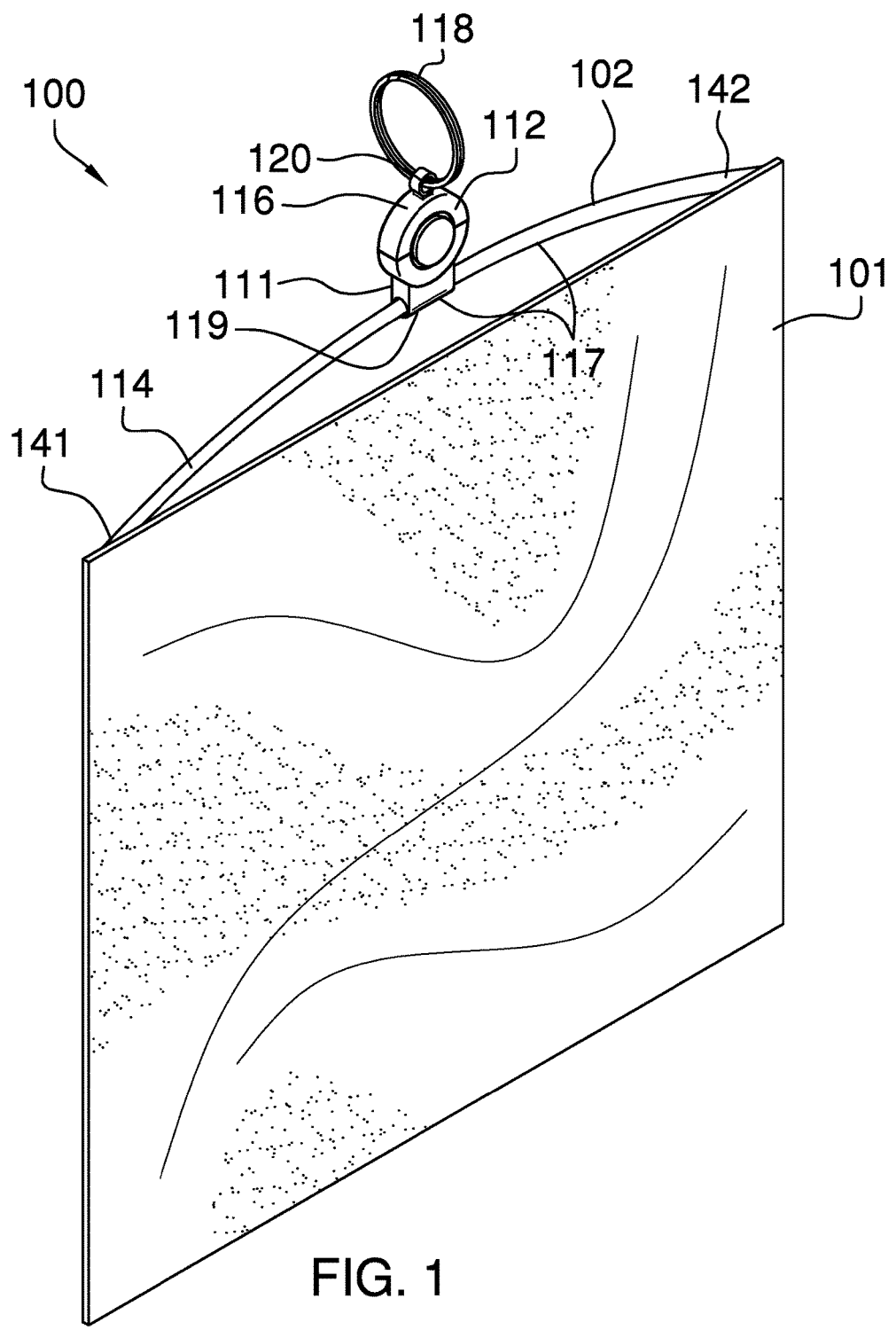
FIG. 1 is a perspective view of an embodiment of the disclosure.
Figure 2:
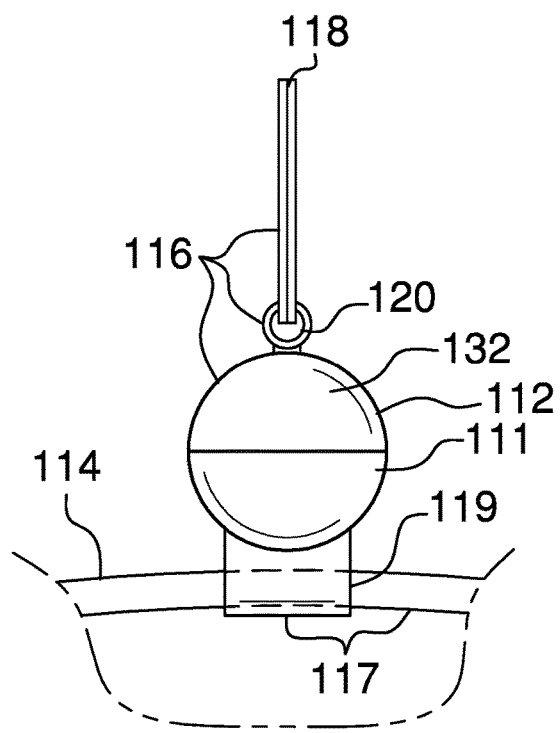
FIG. 2 is a back view of an embodiment of the disclosure.
Figure 3:
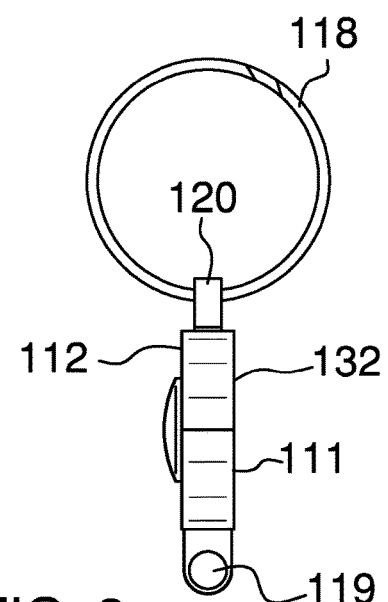
FIG. 3 is a side view of an embodiment of the disclosure.
Figure 4:
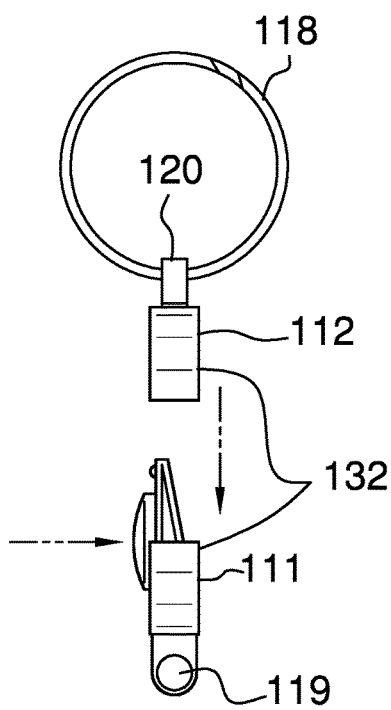
FIG. 4 is an exploded view of an embodiment of the disclosure.
Figure 5:
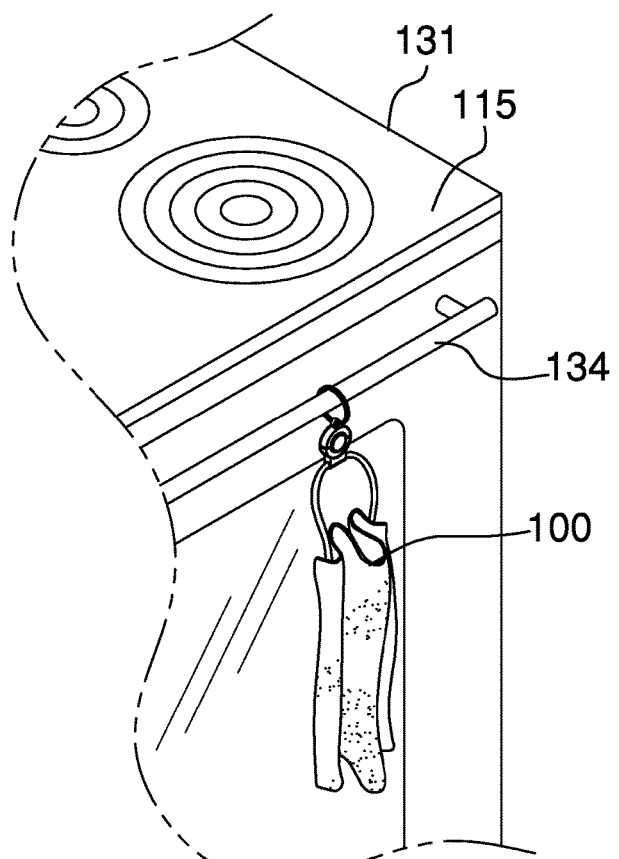
FIG. 5 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The dish towel with separable mating elements 100 (hereinafter invention) comprises a dish towel 101 and an attachment device 102.

The dish towel 101 is an absorbent textile that readily absorbs water. The dish towel 101 is made of a terry fabric or a microfiber fabric.

The attachment device 102 is a device that is used to attach the dish towel 101 to a fixed receiving device 115 such as the handle 134 of an oven 131 or the handle 134 of a refrigerator. The attachment device 102 is also separable which means that a second element 117 of the attachment device 102 is permanently attached to the towel and a first element 116 of the attachment device 102 is permanently attached to the fixed receiving device 115.

The attachment device 102 further comprises a first element 116 and a second element 117. The second element 117 comprises a string 114 and the male separable mating clip 111 of a quick release device 132. The string 114 further comprises a first end 141 and a second end 142. The first element 117 comprises a first ring 118 and the female separable mating clip 112 of a quick release device 132. The male separable mating clip 111 and the female separable mating clip 112 combine to form the quick release device 132. The quick release device 132 is a readily and commercially available quick release buckle 131.

The first end 141 of the string 114 is attached to the dish towel 101. The first end 141 of the string 114 can be attached to the dish towel 101 by sewing or with the use of glue. The second end 142 of the string 114 is fished through a channel 119 that is formed as part of the male separable mating clip 111 of a quick release device 132. The channel 119 can be sized specifically to receive the string 114, as shown in FIG.

1, but this is not necessary. The ring slider that are commonly associated with the male connector of a quick release buckle is also an adequate channel 119. The second end 142 of the string 114 is attached to the dish towel 101. The second end 142 of the string 114 can be attached to the dish towel 101 by sewing or with the use of glue. The string 114 is a commercially available cord. If desired, the string 114 can include a wire core which would act like a spring to keep the first end 141 of the string 114 and the second end 142 of the string 114 separated as shown in FIG. 1.

The first ring 118 is a circular band that is used to connect the female separable mating clip 112 to the fixed receiving device 115. The first ring 118 is a commercially available key ring which has a threading capability that allows the first ring 118 to be attached to a hole. To attach the first ring 118 to the female separable mating clip 112, the first ring 118 is threaded through the second ring 120 which is formed on the female separable mating clip 112. Alternatively, the first ring 118 can be threaded through the ring slide that is commonly associated with the female connector of a quick release device 132.

The first ring 118 is also used to connect the second element 117 to the fixed receiving device 115. The first way to connect the second element 117 to the thread a handle 134, or other portion, of the fixed receiving device 115 through the first ring 118. The second way to attach the second element 117 to the thread a handle 134, or other portion, of the fixed receiving device 115 is to use a carabiner to link the first ring 118 to the handle 134, or other portion, of the fixed receiving device 115.

The use the invention 100, the second element 117 is connected to the fixed receiving device 115. The male separable mating clip 111 is inserted into the female separable mating clip 112 to hold the dish towel 101 in position. When the time comes to use the dish towel 101, the male separable mating clip 111 is separated from the female separable mating clip 112, the dish towel 101 is used normally, and the male separable mating clip 111 is reinserted into the female separable mating clip 112.

The following definitions were used in this disclosure:

Buckle: As used in this disclosure, a buckle is a fastening that is used for joining a first loose end of a strap to a second loose end of the same strap or a different strap. A buckle further comprises a male connector that is attached to a first loose end and a female connector that is attached to a second loose end. The male connector has a pin or other structure that is generally caught by a structure formed in the female connector.

Carabiner: As used in this disclosure, a carabiner is coupling link that is usually formed as an oblong metal ring with one spring hinged side that is used to open and close the ring. Synonyms for carabiner include D-link.

Cord: As used in this definition, a cord is a long, thin, and flexible piece of string, line, or rope. Cords are made from yarns, piles, or strands of material that are braided or twisted together. Cords have tensile strength but are too flexible to provide compressive strength and are not suitable for use in pushing objects. String, line, and rope are synonyms for cord.

Microfiber Yarn: As used in this disclosure, a yarn is said to be a microfiber yarn when the average number of filaments or fibers contained in a cross-section of the yarn is greater than the denier of the yarn. Stated differently, a microfiber yarn is a yarn made from fibers or filaments with an average fineness, as measured by denier, of less than one denier. Please note: This definition is similar to but differs from the definition of microfiber yarn that is generally accepted in the textile industry. This definition of is preferred in this disclosure because of the relative simplicity of the definition and because the difference between the two definitions has little commercial or practical relevance.

Microfiber Fabric: As used in this disclosure, a microfiber fabric is a fabric that is formed from microfiber yarns.

Quick Release Device: As used in this disclosure, a quick release device is a specific type of buckle wherein the buckle can be readily and easily disconnected by pressing a button or pinching one of the ends of the quick release buckle. Quick release devices are readily and commercially available.

Terry Fabric: As used in this disclosure, a terry fabric is a textile that is formed with a plurality of uncut loops on both sides of the fabric. The plurality of uncut loops make a terry fabric highly water absorbent. Terry fabrics often comprise cotton yarns. Terry cloth is a synonym for terry fabric.

Textile: As used in this disclosure, a textile is a material that is woven, knitted, or felted. Synonyms in common usage for this definition include fabric and cloth.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A dish towel with separable mating elements comprising:
   a dish towel and an attachment device;
   wherein the attachment device attaches the dish towel to a fixed receiving device;
   wherein the attachment device comprises a first element and a second element;
   wherein the first element and second element can be attached together;
   wherein the first element and the second element can be separated;
   wherein the separation of the first element and the second element releases the dish towel from the fixed receiving device;
   wherein the dish towel is an absorbent textile;
   wherein the second element is permanently attached to the dish towel;
   wherein the first element of the attachment device is permanently attached to the fixed receiving device;
   the second element comprises a string and a male separable mating clip;
   wherein the string further comprises a first end and a second end.

2. The dish towel with separable mating elements according to claim 1 wherein the first element comprises a first ring and a female separable mating clip.

3. The dish towel with separable mating elements according to claim 2 wherein the male separable mating clip and the female separable mating clip combine to form the quick release device.

4. The dish towel with separable mating elements according to claim 3 wherein the first end of the string is attached to the dish towel.

5. The dish towel with separable mating elements according to claim 4 wherein the first end of the string is attached to the dish towel by sewing or with the use of glue.

6. The dish towel with separable mating elements according to claim 4 wherein the second end of the string is fished through a channel that is formed as part of the male separable mating clip.

7. The dish towel with separable mating elements according to claim 6 wherein the second end of the string is attached to the dish towel.

8. The dish towel with separable mating elements according to claim 7 wherein the second end of the string is attached to the dish towel by sewing or with the use of glue.

9. The dish towel with separable mating elements according to claim 6 wherein the string further comprises a wire core.

10. The dish towel with separable mating elements according to claim 6 wherein the first ring is a circular band that is attached to the female separable mating clip.

11. The dish towel with separable mating elements according to claim 10 wherein the first ring is attached to the fixed receiving device.

12. The dish towel with separable mating elements according to claim 6 wherein the female separable mating clip is attached to the male separable mating clip.

13. The dish towel with separable mating elements according to claim 1 wherein
the second element comprises a string and a male separable mating clip;
wherein the first element comprises a first ring and the female separable mating clip.

14. The dish towel with separable mating elements according to claim 13 wherein the first ring is a circular band that is attached to the female separable mating clip.

15. The dish towel with separable mating elements according to claim 14 wherein the first ring is attached to the fixed receiving device.

16. The dish towel with separable mating elements according to claim 15 wherein the female separable mating clip is attached to the male separable mating clip.

* * * * *